UNITED STATES PATENT OFFICE.

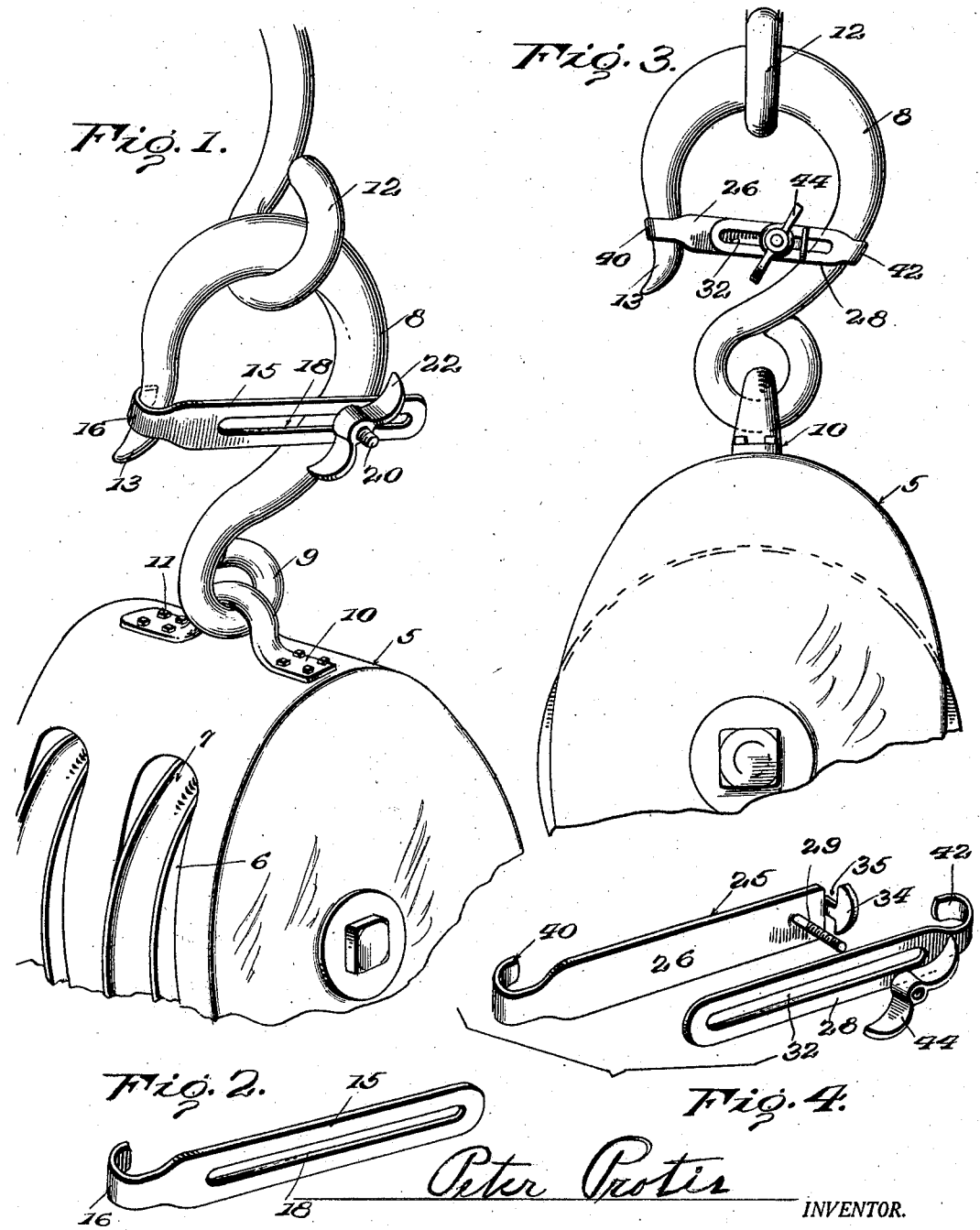

PETER PROTIS, OF PHILADELPHIA, PENNSYLVANIA.

SAFETY HOOK.

1,402,652.   Specification of Letters Patent.   Patented Jan. 3, 1922.

Application filed August 10, 1921. Serial No. 491,159.

*To all whom it may concern:*

Be it known that I, PETER PROTIS, a citizen of the United States, residing at Philadelphia, in the county of Philadelphia and State of Pennsylvania, have invented certain new and useful Improvements in Safety Hooks, of which the following is a specification.

This invention relates to fastening devices especially adapted for closing the throat or opening in the hook of a pully block or the like.

An important object of this invention is to provide a fastening or closing device for hooks having novel means whereby a link of a chain or the terminal portion of the cable may be prevented from slipping off the bill of the hook.

A further object of the invention is to provide a device of the class described which is neat in appearance, efficient in use and cheap to manufacture.

Other objects and advantages of the invention will be apparent during the course of the following description.

In the accompanying drawing forming a part of this application and in which like numerals are employed to designate like parts throughout the same, Figure 1 is a perspective of the improved fastening device applied.

Figure 2 is a perspective of the same detached.

Figure 3 is a side elevation of a slightly modified form of the invention applied.

Figure 4 is a group perspective of the form of the invention illustrated in Figure 3.

In the drawing wherein for the purpose of illustration is shown several preferred embodiments of the invention, the numeral 5 generally designates a block having a plurality of pulleys 6 about which a flexible element 7 most likely in the nature of a rope is trained. The usual hook 8 is formed with an attaching loop 9 engaged with an attaching strap 10 secured to the upper end of the block by means of fastening devices 11.

The hook may be suspended from a chain or cable having a loop 12 which is slipped over the pointed terminal portion 13 of the bill of the hook and engaged with the bend in the hook in the manner illustrated in Figures 1 and 2. In use, the loop 12 frequently becomes disengaged from the hook by slipping off the pointed and outwardly directed terminal portion 13 and it is therefore the aim of the invention to provide means whereby the opening in the hook may be closed so as to fasten the loop 12 onto the hook.

As illustrated in Figure 1 an elongated metallic body 15 is arranged at one side of the hook and has its forward portion reduced and formed with a bend defining a bill 16 adapted to be engaged with the curved bill 13 of the hook. The body 15 is also formed with a longitudinally extending slot 18 which receives a fastening screw 20 rigidly connected to the intermediate portion of the hook opposite the curved terminal portion 13 of the bill. A thumb screw 22 is threaded onto the screws 20 and engages the elongated body 15 so as to hold the body securely in an adjusted position.

In use the loop 12 is applied to the hook 8 and the fastening body 15 is subsequently extended across the throat in the hook for preventing the accidental disconnection of the loop 12 from the hook. By reason of the slot 18 which extends for the major portion of the length of the body the device is capable of a variety of adjustments.

As illustrated in Figures 3 and 4 the fastening device which is designated by the numeral 25 includes sections 26 and 28 which are overlapped and slidably connected by means of a pin 29 projecting laterally from the section 26 and through a slot 32 in the section 28. One end portion of the section 26 is extended laterally to define an ear 34 having oppositely arranged grooves or recesses 35 which receive the portions of the section 28 adjacent the slot 32. The ear 34 contacts with the outer side of the section 28 and thereby prevents a pivotal movement of the section 28 about the axis of the screw 29.

The end portion of the section 26 remote from the ear 34 is provided with a bend defining a bill 40 adapted to engage the curved terminal portion of the bill of the hook. The other section 28 is provided with a bill 42 adapted to engage the shank of the hook and thereby close the opening in the hook so that the accidental disconnection of the loop 12 will be prevented.

The device shown in Figures 3 and 4 is especially adapted for use in connection with hooks which do not have the stationary pin or screw bolt for engagement with the fastening device. The sections 26 and 28 may be readily adjusted with relation to each other by loosening the thumb screw 44 threaded onto the threaded screw 29.

I claim:—

1. The combination of a hook having a bend defining a bill, and an elongated body having one end formed with a bill adapted for engaging the bill of the hook, said elongated body being extended across the hook to close the opening in the same and being provided with a pair of adjustably connected sections.

2. The combination of a hook having a bend defining a bill, and an elongated body having one end formed with a bill adapted for engaging the bill of the hook, said elongated body being extended across the hook to close the opening in the same and being provided with a pair of adjustably connected sections, a fastening bolt carried by one of said sections, the other section being provided with a longitudinal slot receiving said fastening bolt, and a fastening nut threaded on said fastening bolt.

3. The combination of a hook having a bend defining a bill, an elongated body having one end formed with a bill adapted for engaging the bill of the hook, said elongated body being extended across the hook to close the opening in the same and inclusive of overlapping elongated sections, one of said sections being provided with a longitudinal slot and the other being provided with a bolt extended through said slot, and a fastening nut threaded on said bolt, one of said sections being provided with a laterally projecting ear passed through said slot whereby to connect the sections, said ear being provided with oppositely arranged grooves receiving the portions of one of said sections adjacent said slot.

In testimony whereof, I have affixed my signature in the presence of two witnesses.

PETER PROTIS.

Witnesses:
JOHN SCHNELL,
ARCHIBALD A. KALLIS.